United States Patent
Subramanyam

(10) Patent No.: US 12,211,494 B2
(45) Date of Patent: Jan. 28, 2025

(54) SYSTEM AND METHOD FOR AUTOMATED PROCESSING OF SPEECH USING MACHINE LEARNING

(71) Applicant: CONDUENT BUSINESS SERVICES, LLC, Florham Park, NJ (US)

(72) Inventor: Ashwin Subramanyam, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 283 days.

(21) Appl. No.: 17/735,410

(22) Filed: May 3, 2022

(65) Prior Publication Data
US 2023/0360644 A1  Nov. 9, 2023

(51) Int. Cl.
*G10L 25/63* (2013.01)
*G10L 15/06* (2013.01)
(Continued)

(52) U.S. Cl.
CPC ........ *G10L 15/1815* (2013.01); *G10L 15/063* (2013.01); *G10L 15/32* (2013.01)

(58) Field of Classification Search
CPC ....... G10L 25/63; G10L 15/18; G10L 15/063; G10L 15/32; G10L 15/26; G10L 15/22; G10L 15/02; G10L 15/16; G10L 2015/223; G06N 20/00; G06N 3/08; G06Q 10/06398; G06Q 10/0639; H04M 3/5175;
(Continued)

(56) References Cited

U.S. PATENT DOCUMENTS

| 11,854,538 B1* | 12/2023 | Rozgic | ..................... G10L 25/63 |
| 2020/0294528 A1* | 9/2020 | Perri | ........................ G06F 3/167 |

(Continued)

OTHER PUBLICATIONS

Bockhorst et al. "Predicting Self-Reported Customer Satisfaction of Interactions with a Corporate Call Center." Joint European Conf. on Machine Learning and Knowledge Discovery in Databases. Springer, Cham, pp. 179-190 (Sep. 2017).
(Continued)

*Primary Examiner* — Jakieda R Jackson
(74) *Attorney, Agent, or Firm* — Jones Robb, PLLC

(57) ABSTRACT

Automated systems and methods are provided for processing speech, comprising obtaining a digitally-encoded speech representation corresponding to a telecommunication interaction, wherein the digitally-encoded speech representation includes at least one of a voice recording or a transcript derived from audio of the telecommunication interaction; obtaining a digitally-encoded data set corresponding to at least one structured feature of the telecommunication interaction; obtaining a reference set, wherein the reference set includes a set of binary-classified existing satisfaction classifications; obtaining a trained machine learning algorithm, wherein the machine learning algorithm has been trained using a first plurality of reference telecommunication interactions which include user-provided satisfaction scores; extracting a feature set from the digitally-encoded speech representation; and by the machine learning algorithm and based on at least one structured feature and the feature set, generating a predicted satisfaction classification for the telecommunication interaction.

20 Claims, 4 Drawing Sheets

(51) Int. Cl.
*G10L 15/18* (2013.01)
*G10L 15/32* (2013.01)

(58) Field of Classification Search
CPC ......... H04M 2201/40; H04M 2201/41; H04M 3/42221; G06F 16/00; G06F 40/30; G06F 9/453; G06F 3/167; G06F 18/24; G06F 16/217; G06F 16/906; G06F 15/35; G06F 15/04

See application file for complete search history.

(56) References Cited

U.S. PATENT DOCUMENTS

| | | | |
|---|---|---|---|
| 2021/0044697 A1* | 2/2021 | Khafizov | G06F 18/285 |
| 2021/0104245 A1* | 4/2021 | Aguilar Alas | G10L 15/16 |
| 2021/0272040 A1* | 9/2021 | Johnson | G06N 5/022 |
| 2022/0328064 A1* | 10/2022 | Shriberg | G10L 25/66 |
| 2023/0034085 A1* | 2/2023 | Shalev | G06F 9/46 |
| 2023/0297778 A1* | 9/2023 | Can | G06F 16/345 |

OTHER PUBLICATIONS

Park & Gates, "Towards Real-Time Measurement of Customer Satisfaction Using Automatically Generated Call Transcripts", CIKM '09: Proceedings of the 18th ACM Conf. on Information & Knowledge Mgmt. pp. 1387-1396 https://doi.org/10.1145/1645953.1646128 (Nov. 2009).

* cited by examiner

SYSTEM AND METHOD FOR AUTOMATED PROCESSING OF SPEECH USING MACHINE LEARNING

TECHNICAL BACKGROUND

The present disclosure generally describes automated speech processing methods and systems, and in particular aspects describes systems and methods implementing machine learning algorithms to process, analyze, and/or predict sentiment and other content-related data in a telecommunication interaction.

Service (e.g., troubleshooting, feedback acquisition, and so on) is often provided in the form of spoken electronic communication (e.g., telephone, digital voice, video, and so on) between agents and customers or users of a product, business, or organization. Analyzing, understanding, and improving speech in electronic customer interactions is thus important in providing goods and services. This is especially true where goods and services are provided to a large number of customers, as the degree of spoken electronic communication with the customers increases accordingly.

In order to understand how satisfied customers are with a provider's goods, services, and customer interactions, providers often measure customer satisfaction (CSAT) data. In the context of electronic customer service center operations, for example, CSAT measures how satisfied the customers are in their telecommunication interactions with the service center executives. Generally, CSAT may be measured through surveys taken by the customer after the end of the telecommunication interactions. However, less than one percent of customers generally respond to such surveys. Moreover, those customers who do respond to the surveys may not form a representative sample of all customers who participate in telecommunication interactions with the provider.

Overview

Various aspects of the present disclosure provide for automated speech processing systems, devices, and methods which implement machine-learning-based feature extraction and predictive modeling to analyze telecommunication interactions.

In one exemplary aspect of the present disclosure, there is provided a computer-implemented method for processing speech, comprising: obtaining a digitally-encoded speech representation corresponding to a telecommunication interaction, wherein the digitally-encoded speech representation includes at least one of a voice recording or a transcript derived from audio of the telecommunication interaction; obtaining a digitally-encoded data set corresponding to at least one structured feature of the telecommunication interaction; obtaining a reference set, wherein the reference set includes a set of binary-classified existing satisfaction classifications; obtaining a trained machine learning algorithm, wherein the machine learning algorithm has been trained using a first plurality of reference telecommunication interactions which include user-provided satisfaction scores; extracting a feature set from the digitally-encoded speech representation; and by the machine learning algorithm and based on at least one structured feature and the feature set, generating a predicted satisfaction classification for the telecommunication interaction.

In another exemplary aspect of the present disclosure, there is provided a computing system for processing speech, the system comprising: at least one electronic processor; and a non-transitory computer-readable medium storing instructions that, when executed by the at least one electronic processor, cause the at least one electronic processor to perform operations comprising: obtaining a digitally-encoded speech representation corresponding to a telecommunication interaction, wherein the digitally-encoded speech representation includes at least one of a voice recording or a transcript derived from audio of the telecommunication interaction, obtaining a digitally-encoded data set corresponding to at least one structured feature of the telecommunication interaction, obtaining a reference set, wherein the reference set includes a set of binary-classified existing satisfaction classifications, obtaining a trained machine learning algorithm, wherein the machine learning algorithm has been trained using a first plurality of reference telecommunication interactions which respectively include user-provided satisfaction scores, extracting a feature set from the digitally-encoded speech representation, and by the machine learning algorithm and based on at least one structured feature and the feature set, generating a predicted satisfaction classification for the telecommunication interaction.

In this manner, various aspects of the present disclosure effect improvements in the technical fields of speech signal processing, as well as related fields of voice analysis and recognition, e-commerce, audioconferencing, and/or videoconferencing.

BRIEF DESCRIPTION OF THE DRAWINGS

These and other aspects of the present disclosure are exemplified by the following Detailed Description, which may be read in view of the associated drawings, in which.

DETAILED DESCRIPTION

The present disclosure provides for systems, devices, and methods which may be used to process speech in a variety of settings. While the following detailed description is presented primarily in the context of a customer-service interaction, this presentation is merely done for ease of explanation and the present disclosure is not limited to only such settings. For example, practical implementations of the present disclosure include remote education sessions, such as online classes, foreign language apps, and the like; spoken training programs, such as employee onboarding sessions, diversity training, certification courses, and the like; and so on.

As used herein, an "agent" may be any user- or customer-facing entity capable of conducting or facilitating a spoken conversation. The agent may be or include a human customer service representative, a chatbot, a virtual assistant, a text-to-speech system, a speech-to-text system, or combinations thereof. A "telecommunication interaction" may include any remote, speech-based interaction between the agent and the customer. The telecommunication interaction may be a telephone call, an audioconference, a videoconference, a web-based audio interaction, a web-based video interaction, a multimedia message exchange, or combinations thereof.

As noted above, many business telecommunication interactions are provided in the form of spoken electronic communication between agents and customers or users. Because very few customers participate in the CSAT surveys and because the participating customers may not form a representative sample, the survey results may not present an accurate representation of agent or site performance. In such cases, the results may be used to develop analyses that are themselves inaccurate or incomplete, and if used to determine modifications to the structure or content of telecommunication interactions may result in inefficient and/or inappropriate use of limited electronic resources such as network bandwidth, processing capability, memory and other resources, agent workstations, battery or other power capacity, and so on. To ensure efficient and appropriate use of such electronic resources and to improve the telecommunication interactions themselves, the present disclosure provides for systems and methods implementing machine learning analyses for feature extraction and predictive modeling to process, section, and/or further analyze speech and sentiment in a telecommunication interaction.

Figure 1:
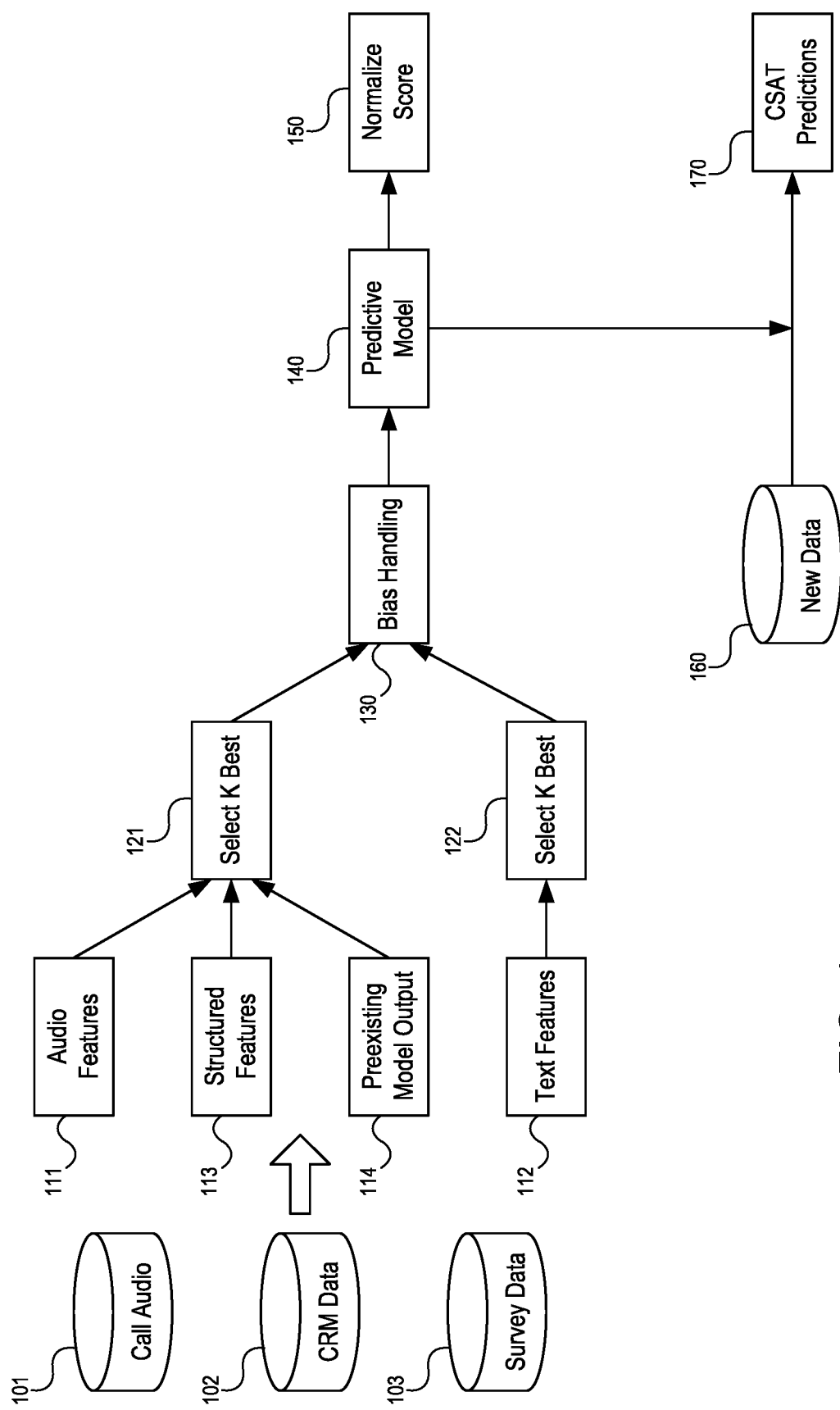
FIG. 1 illustrates an exemplary processing pipeline according to various aspects of the present disclosure.

These and other benefits may be provided by providing systems and/or methods according to the present disclosure. As shown in FIG. 1, the pipeline begins by obtaining at least three different inputs: a digitally-encoded speech representation corresponding to a telecommunication interaction which may include one or both of a voice recording or a transcript derived from audio of the telecommunication interaction, illustrated as call audio data 101; a digitally-encoded data set corresponding to metadata about the telecommunication interaction, illustrated as a customer relationship management (CRM) data 102; and a reference set which may include a set of binary-classified existing satisfaction classifications, illustrated as a survey data 103. On subsequent iterations of the pipeline (i.e., any iteration other than the initializing/training iteration), the pipeline may also obtain a trained machine learning algorithm which has been trained in a manner that will be described in more detail below. The call audio data 101 may be provided in the form of audio files in wav or another audio format if the pipeline is applied to audio calls, or may be provided in the form of chat transcripts with separately identifiable agent and caller utterances if the pipeline is applied to chat logs. While FIG. 1 illustrates the call audio data 101, the CRM data 102, and the survey data 103 as residing in three distinct databases or repositories, in practical implementations all data may be located in one, two, or four or more distinct databases or repositories. In some implementations, data corresponding to a single input (e.g., call audio data 101) may be distributed among several databases or repositories.

Once the appropriate inputs have been obtained, the pipeline proceeds to extract features from the inputted data. For example, the call audio data 101 may be passed through an audio pipeline which involves speech-to-text conversion and/or speaker diarization where the utterances are mapped to caller and agents. A set of audio features 111 may thus be extracted, including call silence ratio (e.g., the time ratio between active audio and silence in the call), overtalk ratio (e.g., the time ratio between audio in which only one participant is speaking and audio in which both participants are simultaneously speaking), talk time ratio (e.g., the time ratio between audio in which the agent is speaking and audio in which the caller is speaking), and the like. The call audio data 101 may additionally or alternatively be passed through the speech-to-text converter and/or speaker diarization to obtain the call transcripts, which may in turn be processed to extract a set of text features 112. For example, the transcript may be passed through a Term Frequency-Inverse Document Frequency (TF-IDF) vectorizer to get TF-IDF values for each unigram and bigram present in the transcript. Alternate representations (e.g., count vectorization, other text embeddings, and the like) may be used instead of TF-IDF vectorizers. The audio features 111 and the text features 112 may form a feature set.

The CRM data 102 may be used to parsed to extract at least one structured feature 113 of the telecommunication interaction. The structured features 113 may include call duration (e.g., the total length of the telecommunication interaction, or one or more partial lengths corresponding to particular topics or sections of the telecommunication interaction), hold count (i.e., the number of times that the agent placed the caller on hold), hold duration, conference count (i.e., the number of times that the agent included another agent or supervisor in the telecommunication interaction), conference duration, transfer count (i.e., the number of times the agent transferred the caller to another agent), and the like. The call audio 101, and in some implementations the survey data 103, may be used to determine a preexisting model output 114, which may be a separate model created to assist with classification. In some examples, the preexisting model output 114 may be based on and/or may include preexisting or custom-built sentiment scores and empathy predictions (and the like) as part of the model. The agent and caller sentiment scores and empathy count may be used as additional features for the model.

At the next stage of the pipeline, the feature set is subjected to a univariate feature selection algorithm. In the illustrated example, a Select K Best algorithm 121 is applied to the audio features 111, the structured features 113, and the preexisting model output 114 to select a subset of features to be used in the model. In some examples, the Select K Best algorithm 121 is applied separately for each category of feature 111 and 113-114 and all of the features thus obtained may be aggregated together. a separate Select K Best algorithm 122 may also be applied to the text features 112. Because, in some implementations, there are a relatively large number of text features present after feature extraction, providing the text features 112 to the separate Select K Best algorithm 122 may improve pipeline results and/or may improve computational efficiency.

If the sample of callers who have previously answered the survey (e.g., in the survey data 103) has different characteristics from the overall caller population, bias may exist in the data. Thus, the pipeline may include bias handling 130. In a first method of bias handling 130, the algorithm weighs the samples in the training data (where CSAT scores are available) based on how similar an interaction is to the overall population and how dissimilar it is to the training samples. This may include a first step, in which a classification model is trained to predict whether a caller will provide a CSAT rating for a telecommunication interaction. The entire call records may be combined, and dependent variables are marked as 0 if the caller gave a CSAT score and 1 if the caller did not. The first method may further include a second step of scoring the model obtained in the first step on all the calls with a CSAT score. The predicted probability gives the weight for that call to be used in developing the CSAT prediction algorithm.

In a second method of bias handling 130, the algorithm inputs a large subsample of calls for which the user has not provided a CSAT rating, and manually obtains the CSAT rating therefor. These new observations are then added to the training data and used to train the algorithm. By manually obtaining the CSAT rating for calls which initially do not have a user-provided one, this method may reduce the effects of self-selection biases that may be present in the first method.

Regardless of whether the first method or the second method is used for bias handling 130, at the next stage of the pipeline may include training the predictive model 140. Training the predictive model 140 may include first converting the CSAT score (e.g., a number from 1 to 5) to a binary variable indicating either a low or a high CSAT. As a result, the predictive model 140 may use a binary classification machine learning algorithm to predict the CSAT (e.g., for future interactions). The binary classification machine learning algorithm may be or include a logistic regression algorithm, a support vector machine (SVM) algorithm, a neural network algorithm, and so on. For example, the binary classification machine learning algorithm may be or include an open-source eXtreme Gradient Boosting (XGBoost) algorithm. In certain implementations, the particular type of binary classification machine learning algorithm may be user-selectable. In such implementations, the XGBoost algorithm may be set as the default option.

The pipeline may then include a normalize score stage 150 in which the scores output by the predictive model 140 are normalized. This stage may include a normalization algorithm including a series of steps. First, the normalize score stage 150 may sort the predicted probability in the trained dataset and obtain the percentiles for each record. Second, based on the frequency distribution of the target (e.g., CSAT score from 1 to 5), the normalize score stage 150 may divide the predicted probability from the first step in the same ratio and obtain the cutoff probability value for each CSAT value. Third, using the cutoff probability for each CSAT value obtained in the second step, the stage may update its value based on a user supplied threshold value, where values below the threshold value are considered low CSAT scores (e.g., 1, 2, and 3 if the threshold is 4) and values equal to or above the threshold value are considered high CSAT scores (e.g., 4 and 5 if the threshold is 4). This may be represented by the following exemplary formula, presented in pseudocode.

```
threshold = 0.5 !user provided value
thresholdLabel = 4
input_bins[ ] = output of second step
for i in range(len(input_bins)): !label thresholds are increased or reduced corresponding to
probability threshold value
   if i < thresholdLabel:
     Bins[i] = (threshold * input_bins[i]) / input_bins[thresholdLabel]
   if i == thresholdLabel:
     Bins[i] = threshold
   if i > thresholdLabel:
     Bins[i] = 1 - (((1 - threshold) * (1 - input_bins[i])) / (1 - input_bins[thresholdLabel]))
```

Finally, the bin thresholds obtained in the third step are applied to model probability outputs of both training and test data.

The above stages of the pipeline may be considered an initial or training pass. The output of the predictive model 140 may be used in future passes through the pipeline to further refine and train the algorithm. For example, the pipeline may obtain new interaction data 160 and, using the predictive model 140, output CSAT predictions 170 for the new interaction data 160. The new data 160 may itself include call audio and/or CRM data, similar to the first stage of the initial pass through the pipeline described above. Thus, the trained predictive model 140 may be used to predict the CSAT scores for new interactions where the actual survey data containing CSAT scores is not available.

Figure 2:
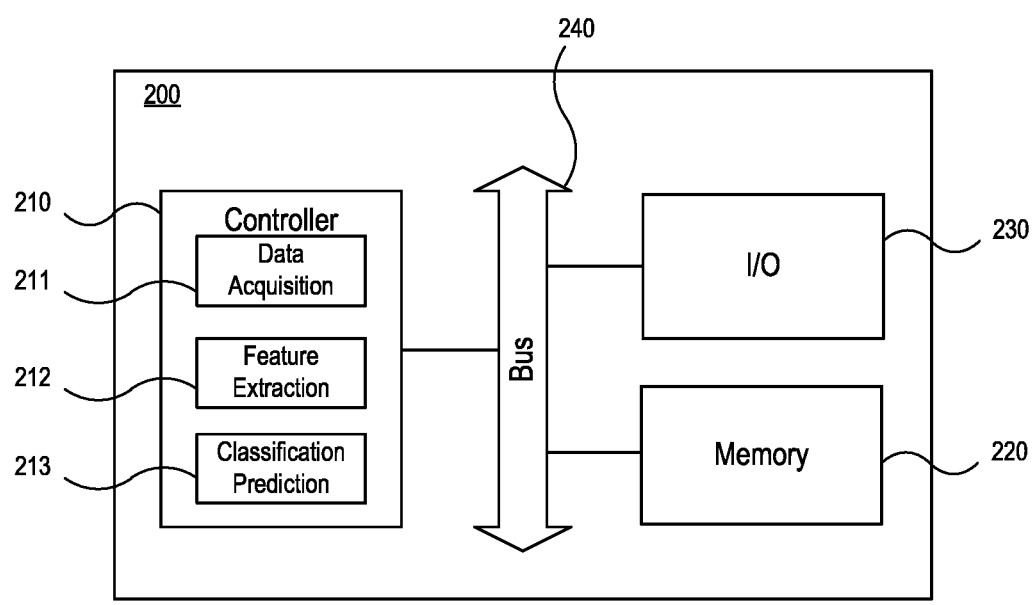
FIG. 2 illustrates an exemplary speech processing system according to various aspects of the present disclosure.

The pipeline of FIG. 1 (or other pipelines consistent with the present disclosure) may be implemented using a speech processing device or speech processing system. FIG. 2 illustrates an exemplary speech processing system 200. The speech processing system 200 includes an electronic processor 210, a memory 220, and input/output (I/O) circuitry 230, each of which communicate with one another via a bus 240. The processor 210 may be or include one or more microprocessors and/or one or more cores. In one implementation, the processor 210 is a central processing unit (CPU) of the speech processing system 200.

The processor 210 may include circuitry configured to perform certain operations. As illustrated, the processor includes an data acquisition unit 211, a feature extraction unit 212, and a classification prediction unit 213. Each of the units 211-213 may be implemented via dedicated circuitry in the processor 210, via firmware, via software modules loaded from the memory 220, or combinations thereof. Collectively, the data acquisition unit 211, the feature extraction unit 212, and the classification prediction unit 213 perform speech processing operations in accordance with the present disclosure. One example of such operations is described in detail here.

The data acquisition unit 211 is configured to perform operations of obtaining data. For example, the data acquisition unit 211 may obtain a digitally-encoded speech representation corresponding to a telecommunication interaction and including one or both of a voice recording or a transcript derived from audio of the telecommunication interaction, a digitally-encoded data set corresponding to at least one structured feature of the telecommunication interaction, and/or a reference set which includes a set of binary-classified existing satisfaction classifications. The at least one structured feature may include at least one of a duration of the telecommunication interaction, a hold count, or a conference count. The data acquisition unit 211 may also obtain a trained machine learning algorithm, wherein the machine learning algorithm has been trained using a first plurality of reference telecommunication interactions which include user-provided satisfaction scores. In some implementations, the machine learning algorithm has further been trained on a second plurality of reference telecommunications interactions which include operator-provided satisfaction scores.

The feature extraction unit 212 may extract a feature set from the digitally-encoded speech representation obtained by the data acquisition unit 211. For example, the feature extraction unit 212 may extract at least one of a call silence ratio, an overtalk ratio, or a talk time ratio.

The classification prediction unit 213 may implement the machine learning algorithm to operate on at least one structured feature obtained by the data acquisition unit 211 and the feature set obtained by the feature extraction unit 212, and may generate a predicted satisfaction classification for the telecommunication interaction. The predicted satisfaction classification may be generated by applying the machine learning algorithm to a first group of features of the feature set, wherein the first group of features corresponds to the voice recording, and by applying the machine learning algorithm to a second group of features of the feature set, wherein the second group of features corresponds to the transcript. Additionally or alternatively, the predicted satisfaction classification may be generated by assigning a category to a plurality of features included in the feature set and the at least one structured feature, aggregating the features into a plurality of feature sub-sets based on assigned category, and applying the machine learning algorithm separately for each feature sub-set.

The classification prediction unit 213 may also provide score normalization and/or response bias correction features. For example, the classification prediction unit 213 may applying a score normalization algorithm to the predicted satisfaction classification to generate a predicted satisfaction score. The score normalization algorithm may be configured to bin the predicted satisfaction classification based on a user-provided threshold. Additionally or alternatively, the classification prediction unit 213 may apply a response bias correction algorithm to the plurality of reference telecommunication interactions.

The memory 220 may be any computer-readable storage medium (e.g., a non-transitory computer-readable medium), including but not limited to a hard disk, a Universal Serial Bus (USB) drive, a removable optical medium (e.g., a digital versatile disc (DVD), a compact disc (CD), etc.), a removable magnetic medium (e.g., a disk, a storage tape, etc.), and the like, and combinations thereof. The memory 220 may include non-volatile memory, such as flash memory, read-only memory (ROM), erasable programmable read-only memory (EPROM), electrically erasable programmable read-only memory (EEPROM), a solid-state device (SSD), and the like; and/or volatile memory, such as random access memory (RAM), dynamic RAM (DRAM), double data rate synchronous DRAM (DDRAM), static RAM (SRAM), and the like. The memory 220 may store instructions that, when executed by the processor 210, cause the processor 210 to perform various operations, including those disclosed herein.

The I/O circuitry 230 may include circuitry and interface components to provide input to and output from the speech processing system 200. The I/O circuitry 230 may include communication circuitry to provide communication with devices external to or separate from the speech processing system 200. The communication circuitry may be or include wired communication circuitry (e.g., for communication via electrical signals on a wire, optical signals on a fiber, and so on) or wireless communication circuitry (e.g., for communication via electromagnetic signals in free space, optical signals in free space, and so on). The communication circuitry may be configured to communicate using one or more communication protocols, such as Ethernet, Wi-Fi, Li-Fi, Bluetooth, ZigBee, WiMAX, Universal Mobile Telecommunications System (UMTS or 3G), Long Term Evolution (LTE or 4G), New Radio (NR or 5G), and so on.

The I/O circuitry 230 may further include user interface (UI) circuitry and interface components to provide interaction with a user. For example, the UI may include visual output devices such as a display (e.g., a liquid crystal display (LCD), and organic light-emitting display (OLED), a thin-film transistor (TFT) display, etc.), a light source (e.g., an indicator light-emitting diode (LED), etc.), and the like; and/or audio output devices such as a speaker. The UI may additionally or alternatively include visual input devices such as a camera; audio input devices such as a microphone; and physical input devices such as a button, a touchscreen, a keypad or keyboard, and the like. In some implementations, the I/O circuitry 230 itself may not include the input or output devices, but may instead include interfaces or ports configured to provide a connection external devices implementing some or all of the above-noted inputs and outputs. These interfaces or ports may include Universal Serial Bus (USB) ports, High-Definition Multimedia Interface (HDMI) ports, Mobile High-Definition Link (MDL) ports, FireWire ports, DisplayPort ports, Thunderbolt ports, and the like.

The I/O circuitry 230 may be used to output various data structures, including but not limited to raw data, predicted satisfaction classifications, algorithm analysis scores (e.g., precision, recall, accuracy, etc.), and so on. These data structures may be output to an external device which may itself include a display to display the data structures to a user, a memory to store the data structures, and so on. Additionally or alternatively, these data structures may be displayed or stored by or in the speech processing system 200 itself.

Figure 3:
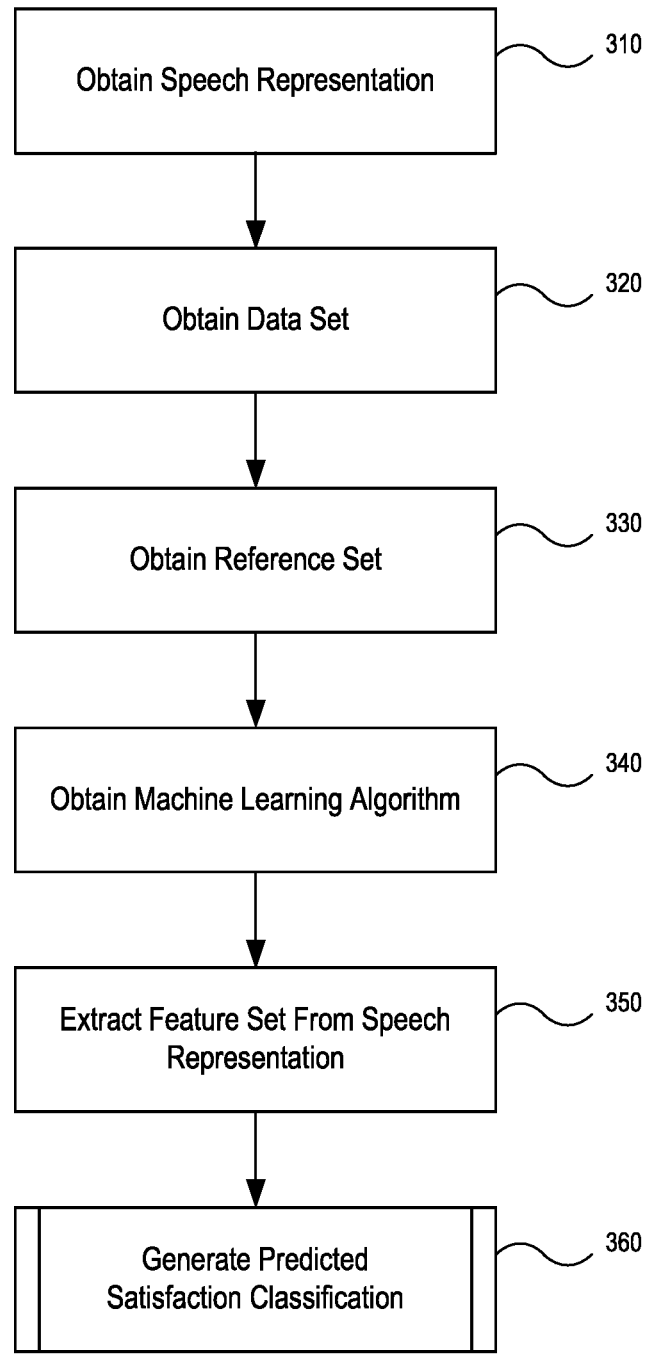
FIGS. 3-5 illustrate exemplary processing methods according to various aspects of the present disclosure.
Figure 4:
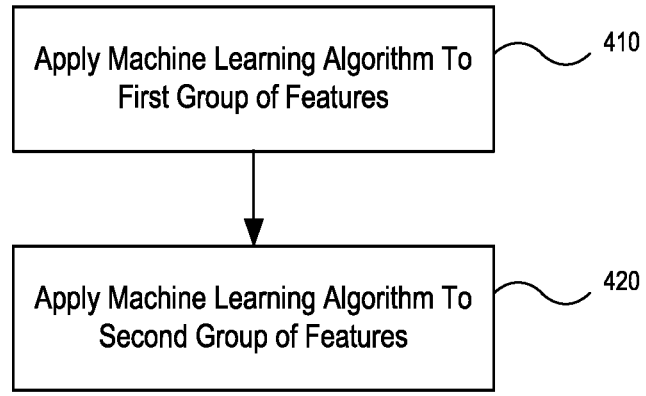
Figure 5:
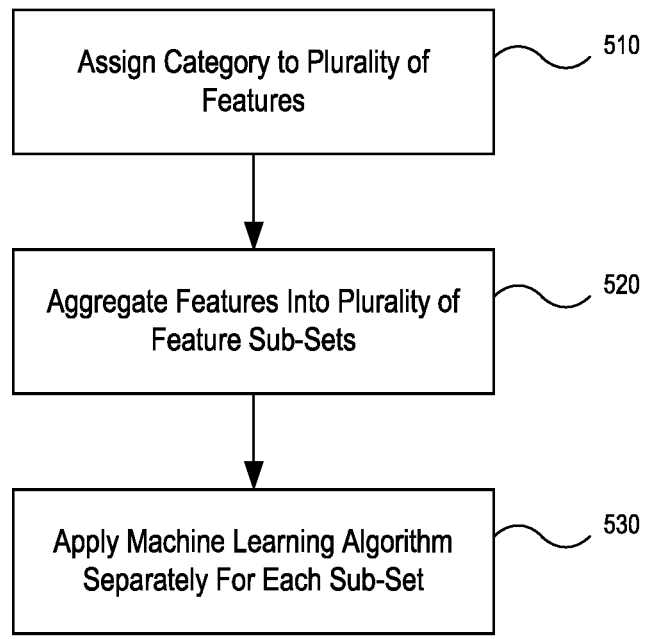

FIGS. 3-5 respectively illustrate various process flows for processing speech in telecommunication interactions, in accordance with the present disclosure. FIG. 3 illustrates an exemplary overall process flow, whereas FIGS. 4 and 5 illustrate exemplary subprocesses which may be included in the overall process flow of FIG. 3. The process flows of FIGS. 3-5 may be performed by the speech processing system 200 described above and/or by other processing systems. The following description is presented from the perspective of a single telecommunication interaction; however, the present disclosure may also be applied in the case of a group or batch of telecommunication interactions.

As shown in FIG. 3, the process flow begins with four operations of data acquisition: obtaining speech representation at operation 310, obtaining a data set at operation 320, obtaining a reference set at operation 330, and obtaining a machine learning algorithm at operation 340. Operations 310-340 are not necessarily performed in this order and are not necessarily four distinct operations. In certain implementations, the data acquisition may occur in any order and certain acquisition operations may occur simultaneously (e.g., as a single operation).

Operation 310 may include obtaining a digitally-encoded speech representation corresponding to a telecommunication interaction, wherein the digitally-encoded speech representation includes at least one of a voice recording or a transcript derived from audio of the telecommunication interaction. In some examples, the digitally-encoded speech representation includes both the voice recording and the transcript Operation 320 may include obtaining a digitally-encoded data set corresponding to at least one structured feature of the telecommunication interaction. Operation 330 may include obtaining a reference set, wherein the reference set includes a set of binary-classified existing satisfaction classifications. Operation 340 may include obtaining a trained machine learning algorithm, wherein the machine learning algorithm has been trained using a first plurality of reference telecommunication interactions which include user-provided satisfaction scores.

After data acquisition, the exemplary process flow includes a feature set extraction operation 350. Operation 350 includes extracting extract a feature set from the digitally-encoded speech representation obtained in operation 310, and may include extracting at least one of a call silence ratio, an overtalk ratio, or a talk time ratio. Operation 350 may be performed at any time after the digitally-encoded speech representation has been obtained (i.e., any time after operation 310), and in some implementations may be performed before data acquisition has completed (i.e., prior to or concurrently with operations 320, 330, and/or 340).

After data acquisition and feature extraction, the exemplary process flow generates a predicted satisfaction classification for the telecommunication interaction at operation 360. Operation 360 may be performed using the machine learning algorithm obtained in operation 340 and may take, as inputs, the structured features obtained in operation 320 and/or the feature set extracted in operation 350.

FIG. 4 illustrates one example of sub-operations which may be included in operation 350. As noted above, the machine learning algorithm may be applied separately to different groups of features. Thus, in FIG. 4, operation 350 includes a first sub-operation 410 of applying the machine learning algorithm to a first group of features of the feature set and a second sub-operation 420 of applying the machine learning algorithm to a second group of features of the feature set. In this example, the first group of features may correspond to a voice recording of the telecommunication interaction and the second group of features may correspond to a transcript of the telecommunication interaction. While not illustrated in FIG. 4, operation 350 is not limited solely to two groups of features of the feature set, and may include additional groups of features. Moreover, sub-operation 410 and sub-operation 420 are not restricted to the order shown in FIG. 4, and may in some implementations be performed in reverse order or in parallel.

FIG. 5 illustrates another example of sub-operations which may be included in operation 350. In FIG. 5, operation 350 includes a first sub-operation 510 of assigning a category to a plurality of features included in the feature set and/or the at least one structured feature, followed by a second sub-operation 520 of aggregating the categorized features into a plurality of feature sub-sets, and a third sub-operation 530 of applying the machine learning algorithm separately for each sub-set.

The sub-operations of FIG. 4 and the sub-operations of FIG. 5 are not mutually exclusive. In some implementations, features may be both grouped and categorized/aggregated. For example, sub-operations 510 and 520 may be performed separately on features corresponding to the voice recording and features corresponding to the transcript. In such an example, sub-operations 510-530 would be sub-operations of sub-operation 410 and sub-operations of sub-operation 420.

The exemplary systems and methods described herein may be performed under the control of a processing system executing computer-readable codes embodied on a non-transitory computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for processing speech, the method comprising:
   obtaining a digitally-encoded speech representation corresponding to a telecommunication interaction, wherein the digitally-encoded speech representation includes at least one of a voice recording or a transcript derived from audio of the telecommunication interaction;
   obtaining a digitally-encoded data set corresponding to at least one structured feature of the telecommunication interaction;
   obtaining a reference set, wherein the reference set includes a set of binary-classified existing satisfaction classifications;
   obtaining a trained machine learning algorithm, wherein the machine learning algorithm has been trained using a first plurality of reference telecommunication interactions which include user-provided satisfaction scores;
   extracting a feature set from the digitally-encoded speech representation, wherein the feature set comprises a first group of features corresponding to the at least one voice recording and a second group of features corresponding to the transcript;

generating a first subset of features as a function of a first univariate feature selection algorithm applied to the first group of features;

generating a second subset of features as a function of a second univariate feature selection algorithm applied to the second group of features; and by the machine learning algorithm and based on at least one structured feature, the first subset of features and the second subset of features, generating a predicted satisfaction classification for the telecommunication interaction.

2. The method according to claim 1, wherein the operation of generating the predicted satisfaction classification includes applying the machine learning algorithm separately for each of the first and second subset of features.

3. The method according to claim 1, further comprising applying a score normalization algorithm to the predicted satisfaction classification to generate a predicted satisfaction score.

4. The method according to claim 3, wherein the score normalization algorithm is configured to bin the predicted satisfaction classification based on a user-provided threshold.

5. The method according to claim 1, further comprising applying a response bias correction algorithm to the plurality of reference telecommunication interactions.

6. The method according to claim 1, wherein the feature set includes at least one of a call silence ratio, an overtalk ratio, or a talk time ratio.

7. The method according to claim 1, wherein the at least one structured feature includes at least one of a duration of the telecommunication interaction, a hold count, or a conference count.

8. The method according to claim 1, wherein the machine learning algorithm has further been trained on a second plurality of reference telecommunications interactions which include operator-provided satisfaction scores.

9. A computing system for processing speech, the system comprising:
at least one electronic processor; and
a non-transitory computer readable medium storing instructions that, when executed by the at least one electronic processor, cause the electronic processor to perform operations comprising:
obtaining a digitally-encoded speech representation corresponding to a telecommunication interaction, wherein the digitally-encoded speech representation includes at least one of a voice recording or a transcript derived from audio of the telecommunication interaction,
obtaining a digitally-encoded data set corresponding to at least one structured feature of the telecommunication interaction,
obtaining a reference set, wherein the reference set includes a set of binary-classified existing satisfaction classifications,
obtaining a trained machine learning algorithm, wherein the machine learning algorithm has been trained using a first plurality of reference telecommunication interactions which respectively include user-provided satisfaction scores,
extracting a feature set from the digitally-encoded speech representation, wherein the feature set comprises a first group of features corresponding to the at least one voice recording and a second group of features corresponding to the transcript, generating a first subset of features as a function of a first univariate feature selection algorithm applied to the first group of features, generating a second subset of features as a function of a second univariate feature selection algorithm applied to the second group of features, and by the machine learning algorithm and based on at least one structured feature, the first subset of features and the second subset of features, generating a predicted satisfaction classification for the telecommunication interaction.

10. The system according to claim 9, wherein the operation of generating the predicted satisfaction classification includes applying the machine learning algorithm separately for each of the first and second subset of features.

11. The system according to claim 9, further comprising applying a score normalization algorithm to the predicted satisfaction classification to generate a predicted satisfaction score.

12. The system according to claim 11, wherein the score normalization algorithm is configured to bin the predicted satisfaction classification based on a user-provided threshold.

13. The system according to claim 9, further comprising applying a response bias correction algorithm to the plurality of reference telecommunication interactions.

14. The system according to claim 9, wherein the feature set includes at least one of a call silence ratio, an overtalk ratio, or a talk time ratio.

15. The system according to claim 9, wherein the at least one structured feature includes at least one of a duration of the telecommunication interaction, a hold count, or a conference count.

16. The system according to claim 9, wherein the machine learning algorithm has further been trained on a second plurality of reference telecommunications interactions which respectively include operator-provided satisfaction scores.

17. A computer-implemented method for processing speech, the method comprising:
obtaining a digitally-encoded speech representation corresponding to a telecommunication interaction, wherein the digitally-encoded speech representation includes at least one of a voice recording or a transcript derived from audio of the telecommunication interaction;
obtaining a digitally-encoded data set corresponding to at least one structured feature of the telecommunication interaction; obtaining a reference set, wherein the reference set includes a set of binary-classified existing satisfaction classifications;
extracting a feature set from the digitally-encoded speech representation, generating a subset of features from the feature set using a univariate feature selection algorithm;
obtaining training data comprising a first plurality of reference telecommunication interactions which include user-provided satisfaction scores;
generating a weighted training data based on the training data, training a machine learning model using the weighted training data;
generating a predicted satisfaction classification for the telecommunication interaction, using the trained machine learning model, based on at least one structured feature and the subset of features.

18. The method of claim 17, wherein generating the weighted training data comprises classifying the training data, using a classification model, based on whether the training data contains user-provided satisfaction scores.

19. The method of claim 18, wherein the user-provided satisfaction scores comprises CSAT scores.

20. The method of claim 18, wherein generating the weighted training data further comprises scoring the data in the training data classified as containing the user-provided satisfaction scores.

* * * * *